United States Patent
Oswald et al.

(10) Patent No.: US 7,523,317 B2
(45) Date of Patent: Apr. 21, 2009

(54) COMPUTER GRID ACCESS MANAGEMENT SYSTEM

(75) Inventors: William Andrew Oswald, Rochester, MN (US); Janice Lynn Pascoe, Rochester, MN (US); Paul Emery Schardt, Rochester, MN (US); Lance Gordon Thompson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/835,454

(22) Filed: Apr. 29, 2004

(65) Prior Publication Data

US 2005/0246547 A1   Nov. 3, 2005

(51) Int. Cl.
*H04L 9/00* (2006.01)
(52) U.S. Cl. ...................................................... 713/182
(58) Field of Classification Search .................. 713/182
See application file for complete search history.

(56) References Cited

U.S. PATENT DOCUMENTS

| 6,519,568 | B1 * | 2/2003 | Harvey et al. .................. 705/1 |
| 6,643,683 | B1 | 11/2003 | Drumm et al. |
| 7,080,120 | B2 | 7/2006 | Betros et al. |
| 2003/0079121 | A1 * | 4/2003 | Gilman et al. .............. 713/153 |
| 2004/0098447 | A1 * | 5/2004 | Verbeke et al. .............. 709/201 |
| 2004/0193679 | A1 * | 9/2004 | Tecco et al. .................. 709/203 |
| 2005/0015439 | A1 | 1/2005 | Balaji et al. |
| 2005/0078822 | A1 * | 4/2005 | Shavit et al. ................. 380/201 |

* cited by examiner

*Primary Examiner*—Andrew L Nalven
(74) *Attorney, Agent, or Firm*—Wood, Herron & Evans, LLP

(57) ABSTRACT

An apparatus, program product and method for managing access to a remote computing grid that is not normally accessible to a client. A client computer may communicate with the computing grid via a dropbox configured to receive and distribute data between the client computer and the grid. The connection may remain open while multiple commands are thus communicated to the computing grid, and the identity of the client submitting the commands may be authenticated.

19 Claims, 7 Drawing Sheets

COMPUTER GRID ACCESS MANAGEMENT SYSTEM

FIELD OF THE INVENTION

The invention is generally related to computer software and networked computers, and more particularly, to accessing remote computing sources.

BACKGROUND OF THE INVENTION

Grid processing techniques enable greater processing opportunities by sharing and coordinating the resources of multiple computers that comprise a grid. As such, grid computing allows organizations to optimize computing and data resources by pooling their respective resources together to handle or balance workloads. For instance, a grid computing system may be used to verify the components of a microchip design. Verification assures that each of the millions of transistors and registers of a design performs its required function. Design verification typically consumes about seventy percent of computing time and resources of a design project. In some cases, the volume of components employed in a typical microchip design cannot be practically evaluated without the pooled computer resources of a grid.

Where a business requiring such computing power does not have its own onsite computing grid, that business will often contract with a company having the needed resources. Continuing with the above example, it may be cost ineffective for a microchip design company to own and maintain its own computing grid when sufficient grid resources are commercially available for a reasonable fee. As such, the chip design company has great incentive to submit their design or other project to a provider operating a grid computing resource.

Despite their economic practicality, conventional grid submission practices can present certain inconveniences. For instance, to maintain integrity and provide a secure environment, a grid may not be accessible from the Internet. Most conventional submission practices must consequently be accomplished manually. For instance, a chip designer seeking verification of a design must mail applicable design parameters to a computer grid provider. This design data may be submitted on a disk or may be sent as an attachment to an electronic mail transmission. In either case, an administrator having access to the provider computer grid must open and evaluate the design data to determine the most appropriate grid resources that should be applied to accomplish the task. That is, conventional grid submission practices require provider personnel to acknowledge the receipt of an email or postal delivery, and to forward it on to an applicable party or network. For instance, an administrator may manually evaluate code or message text to determine that one set of submitted data needs to be compiled by a first program executed by the grid, while a second set of data needs a simulation program.

Conventional processes can also render the grid computing resource vulnerable to corrupt data submissions. For instance, there are few regulated safeguards in place to assure that only legitimate data prepared by qualified programmers is submitted for execution by a grid resource. Improperly formatted, viral or otherwise corrupted data could impair susceptible and valuable grid processes and equipment. Consequently, it is incumbent upon the administrator to take steps to manually verify that the submitted data is properly formatted and does not contain a virus. These manual processes can be tedious, inefficient and error prone.

Known grid submission practices present additional privacy and data integrity concerns. For instance, access granted to grid users often allows them to view the work of other users. Different programs running concurrently on the grid may even interfere with each other. Conventional grid partitioning can limit a customer's access to a specific set of grid systems, but this partitioning practice requires grid administrators to manually sanitize the systems when allocating them from one user to another. This sanitation can include the costly and cumbersome tasks of deleting all the data on a hard drive of a grid computer and reinstalling an operating system. Partitioning also results in underutilization of resources. Consequently, periods may occur where one customer is not utilizing all their dedicated resources, while another customer experiencing a peak workload is left with inadequate resources. Again, such scenarios must be manually addressed by grid administrators. For at least the above stated reasons, there exists a need for an improved manner of accessing remotely located grid computing resources.

SUMMARY OF THE INVENTION

The invention addresses these and other problems associated with the prior art by providing an improved apparatus, program product, and method for managing access to a remote computing grid that is not normally accessible to a client. To this end, a connection over a public telecommunications network is established between a client computer and a server computer. The server computer includes or otherwise has access to the grid computing resource. The server may also include a dropbox server for facilitating communication between the client computer and the grid resource. The client computer sends package data for processing by the remote computing grid to the server computer over the connection, which may include the Internet. The package data may comprise at least one of command and file data information.

The server computer communicates the package data to the remote computing grid. The remote grid computing resource processes the data and automatically generates a result. This result is typically communicated back to the server computer. The server computer, in turn, communicates the result back to the client computer over the public network connection. Where desired, the public telecommunication network may include encryption technologies and/or a secure connection. A firewall may additionally separate the server computer from the client computer.

For additional security and data integrity, the identity of a client attempting to submit information to the grid computing resource may be authenticated. The security credentials obtained during authentication are long live in nature, allowing several consecutive package data transmissions to be communicated without requiring re-authentication, for instance. Moreover, steps may be taken to ensure that the most up-to-date applications and formats are being used by the client prior to submission. Such precautions may be accomplished, in part, using a graphic user interface displayed on the client computer.

New package data may be sent while earlier submitted package data is stored at the dropbox server, retrieved by the server, or executed by the grid computing resource. This feature promotes greater processing speed and efficiency. Where desired, the package data may be prompted using the graphic user interface displayed locally at the computer of the client.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
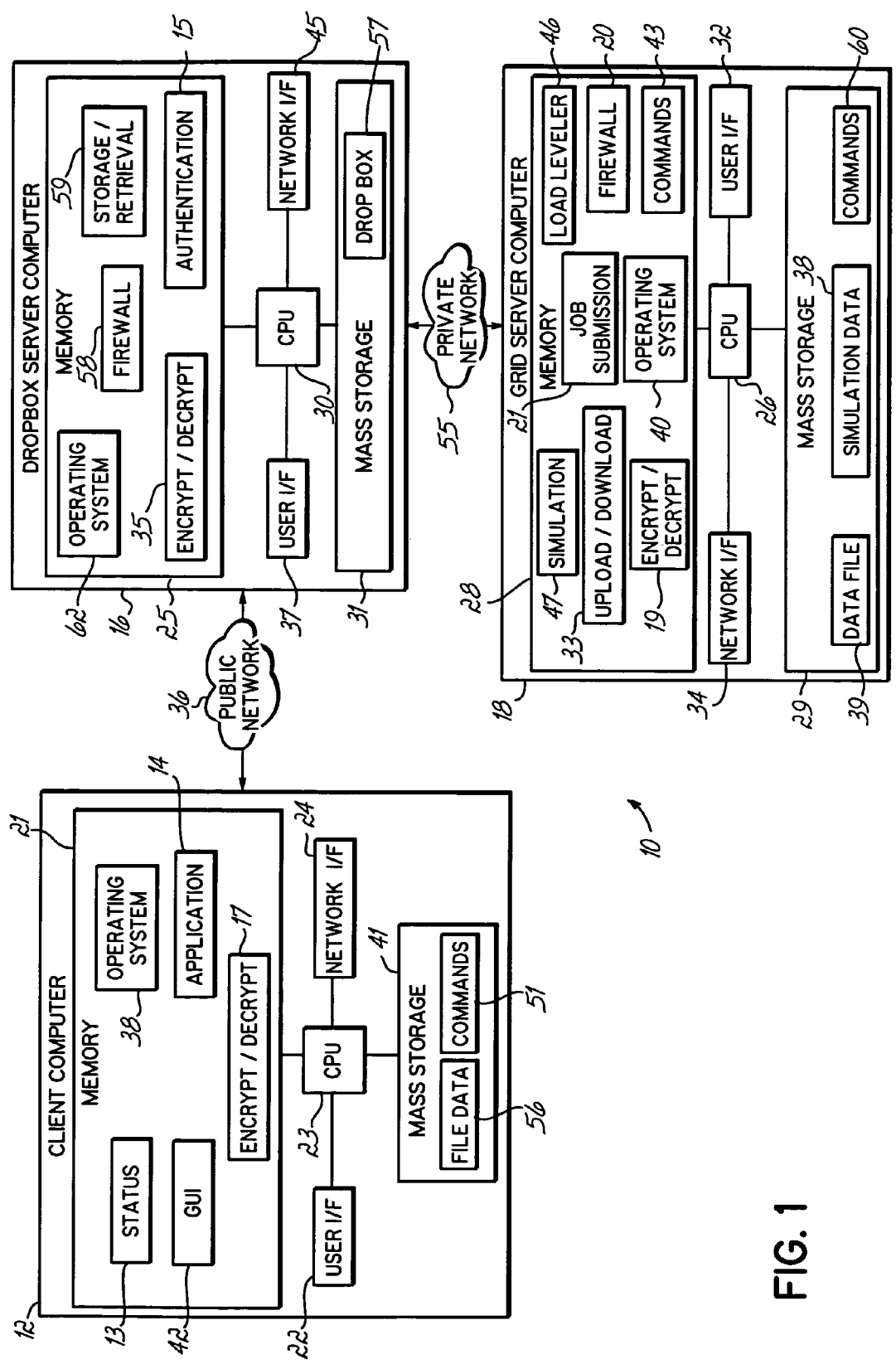
FIG. 1 is a block diagram showing a client-server based computer system configured to manage access to remote grid resources.

The present invention, in one respect, provides managed access to a remote computing grid that is not normally accessible to a client. More particularly, a client computer may communicate with the computing grid via a dropbox computer configured to receive and distribute data between the client computer and the computing grid. The connection, or communication protocol, may remain open while multiple commands are thus communicated to the computing grid. Where desired, the identity of the client submitting the commands may be authenticated for data and system integrity considerations. In one respect, the client's request to submit a job is decoupled from the grid job submission process. This results in no end-to-end connection from the client to the system in the grid, a solution to security and integrity concerns, and an increase in system utilization because partitioning of the grid is no longer necessary.

A user is thus provided with secure, automatic and timely access to grid computing resources. Features of the present invention may allow the user to select data and commands for execution within a computing grid. The file data and command information are typically bundled into a package associated with the user. The package may then be transmitted from a client computer to a dropbox server computer. The dropbox server computer may be located behind a firewall of a provider. In one respect, the invention thus presents a customer with a path to grid computing resources that may be inside of a provider's firewall. As such, the dropbox server computer inside of the firewall may provide a protocol with which a customer may present, for instance, a package comprising a simulation test case.

A grid server computer having access to the grid computing resources may be notified that the package is available for retrieval from the dropbox server computer. The grid server computer may automatically receive and unbundle the package. The grid server computer then may execute the command and the data using the grid computing resources. When the command completes, the grid server computer may bundle the results into another package for transmission back to the dropbox server computer. The results are typically addressed to the originating user. Where applicable, the dropbox server computer may divert special files to project storage for analysis. In any case, the results are typically automatically received, unbundled, stored and displayed for evaluation by the user at the client computer.

The identity of the user may be authenticated prior to submitting the package. Features of the present invention thus ensure the security of the computing grid resources by improving the integrity of data submitted to the grid. By verifying the identity of a sender, such practices introduce accountability and system checks that help to ensure that only reputable programs are delivered to and executed by the computing grid.

In an embodiment that is consistent with the invention, the direct access of a client to the grid is restricted. Rather, the client selects requests that are communicated via the dropbox server computer to the grid. In some instances, only program code and file data installed on and maintained by the grid system are run on the grid. Features of the present invention thus avoid the conventional partitioning requirement. Consequently, grid systems do not require sanitation, and any job may run on any system. Administrator costs are further reduced, and grid resources may be more efficiently utilized, e.g., on demand.

Aspects of the invention may further provide access to the computing grid over a secure connection. Where desired, provisions may be made to handle large data sizes and long running commands. In addition, the system is automated and requires no intervention once a command is launched by the user. Moreover, grid computing resources remain available to a number of different customers, i.e., the grid resources do not need to be dedicated to any one specific user. This feature allows vast resource sharing and utilization while minimizing costs.

Hardware and Software Environment

FIG. 1 is a block diagram showing a client-server based computer system 10 configured to manage access to remote grid resources. Continuing with the above example, the exemplary system 10 has particular application in the context of microchip design verification processes. Design verification assures that each of the transistors and registers of a design performs its required function. Turning more specifically to FIG. 1, the system 10 includes at least one client computer 12, in addition to one or more server computers 16, 18. More particularly, a dropbox server computer 16 is shown for exemplary purposes as being separate from a grid server computer(s) 18, and may be situated behind a firewall of a provider for security considerations. The grid server computer 18 may also be positioned behind a second firewall and generally comprises part of a grid computing resource. The grid computing resource typically includes multiple computers, not limited to the dropbox server and grid server computers 16 and 18, respectively.

Client computer 12 includes at least one central processing unit 23 that couples to a memory 21. The memory 21 may include random access memory (RAM) devices comprising the main storage of computer 12, as well as any supplemental levels of memory, e.g., cache memories, non-volatile or backup memories (e.g., programmable or flash memories), read-only memories, etc. For instance, the memory 21 may include program code 13 configured to report on the status of a submitted package. Encryption program code 17 may format data to safeguard transmission. Still another exemplary program 42 may initiate the display of a graphic user interface (GUI) on a monitor of the client computer 12. One skilled in the art will appreciate that some such programs and other applications 14 may alternatively and/or additionally reside on the dropbox server computer 16. In addition, the memory 21 may be considered to include memory storage physically located elsewhere in the computer 12, e.g., any cache memory in a processor or a smart card, as well as any storage capacity used as a virtual memory, e.g., as stored on a mass storage device 41 or on another computer coupled to the computer 12.

Computer 12 typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 41, e.g., a floppy or other removable disk drive, a hard disk drive, a direct access storage device (DASD), an optical drive (e.g., a CD drive, a DVD drive, etc.), smart card and/or a tape drive, among others. The exemplary mass storage 41 may include data file information 56 and commands 51. A command 51 includes the name of and parameters for program code to be executed by the grid server computing resource. A command 51 stored on the client computer 12 may not include an actual program, but may rather include a command name and parameters that are later associated with the program code executed by the grid server computer 18. In a such a scenario, the grid server computer 18 may retrieve the applicable program code in response to receiving the command. Similarly, the file data 56 may include a designation useful in retrieving the actual needed data from remote storage accessible to the grid server computer 18. Other data selections consistent with the invention may, however, include data retrieved from the client computer 12.

Client computer 12 may also include an interface 24 with one or more networks (e.g., a LAN, a WAN, a wireless network, and/or the Internet 27, among others) to permit the communication of information with other electronic devices. It should be appreciated that the client computer 12 typically includes suitable analog and/or digital interfaces between CPU 23 and each of its respective computer components as is well known in the art.

Similar to client computer 12, dropbox server computer 16 includes a CPU 30, memory 25, mass storage 31, user interface 37 and network interface 45. Memory 25 may include a decryption and encryption program 35 to process an incoming package arriving from the client computer 12. Decryption and encryption are processes that use algorithms to transform encrypted information back into a readable format, called plain text. For additional security, dropbox communications may use the Hypertext Transfer Protocol over Secure Socket Layer (HTTPS) protocol to provide a secure, tunnel-like environment.

An authentication program 15 may be used to ensure that only the addressee can retrieve data addressed to the addressee from the dropbox server computer 16. To this end, authentication may include submission of an identification and a password. Another program 59 in memory 25 manages the communication of packages between the client computer 12 and the dropbox server computer 16, and the dropbox server computer 16 and grid server computer 18. For instance, the storage and retrieval program 59 may be used to store packages within a dropbox memory 57 from the client computer for the grid server. Mass storage 31 of the dropbox server computer 16 may include the dropbox memory 57 for storing incoming packages. Each customer may have an individual dropbox memory section.

A firewall program 58 may be used to secure data within the dropbox server computer 16. Namely, the firewall program 58 is a feature that is used to prevent unauthorized access to a network. For instance, a firewall may be used to ensure that communication conforms to an organization's security policies. Basic firewalls may include filtering and relay features intended to regulate incoming and/or outgoing information.

As with the other computers 12, 18 shown in FIG. 1, the dropbox server computer 16 may comprise multiple additional programs, storage and computers. Moreover, while more capable computer systems may present advantages in certain embodiments consistent with the principles of the present invention, a suitable computer for purposes of this specification may comprise practically any device configured to receive and process an electronic message transmitted from another networked computer.

Similar to dropbox server computer 16, grid server computer 18 includes a CPU 26, memory 28, mass storage 29, user interface 32 and network interface 34. Memory 28 may include a program 47 for simulating an aspect of a microchip design, in addition to other command related programs 43. Load leveler program 46 manages grid server resources. The load leveler program 46, for instance, manages priority and classes of machines for the distribution of work. The memory 28 may also include a package upload/download program 33, a firewall program 20, a job submission program 21 and an encryption/decryption program 19. The mass storage 29 may include stored copies of file and simulation data 38 and 39, respectively, as well as command programs 60. A job submission program 21 submits packages to the load leveler program 46 of the grid server computer 18. To ensure security, a unique user ID may be assigned to each project that automatically runs the job submission program 21. The job submission program 21 may include polling techniques used to check the dropbox memory 57 for work. If the job submission program 21 finds a command in the dropbox memory 57, for instance, the associated files may be retrieved from the dropbox memory 57. The job submission program 21 may include multiple job submission daemons, each assigned to a respective client and/or task. To this end, the job submission program 21 may automatically evaluate the contents of a dropbox 57 and automatically submit packages as appropriate. Where advantageous, the same package may be automatically submitted a number of times. One skilled in the art will appreciate that like computers 12 and 16, computer 18 may comprise more than one computer.

Computers 12 and 16 are generally interfaced with one another via a network 36, which may be public and/or private, wired and/or wireless, local and/or wide-area, etc. As shown in FIG. 1, network 36 includes the Internet. As such, network 36 may represent multiple, interconnected networks. Such an arrangement facilitates ready access to information stored on the respective computers 12 and 16, as well as timely notifications and updates. Communication between grid server computer 18 and dropbox server computer 16 is facilitated by another network connection 55, which may include a secure intranet. However, connection 55 may also include a publicly switched network, where appropriate.

Each computer 12, 16 and 18 operates under the control of an operating system 62, 38, 40 and executes or otherwise relies upon various computer software applications, components, programs, objects, modules, data structures, etc. Moreover, various applications, components, programs, objects, modules, etc. may also execute on one or more processors in another computer coupled to computer 12, 16 and 18 via a network, e.g., in a distributed or customer-billing computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein. Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Grid Access Management Processes

Figure 2A:
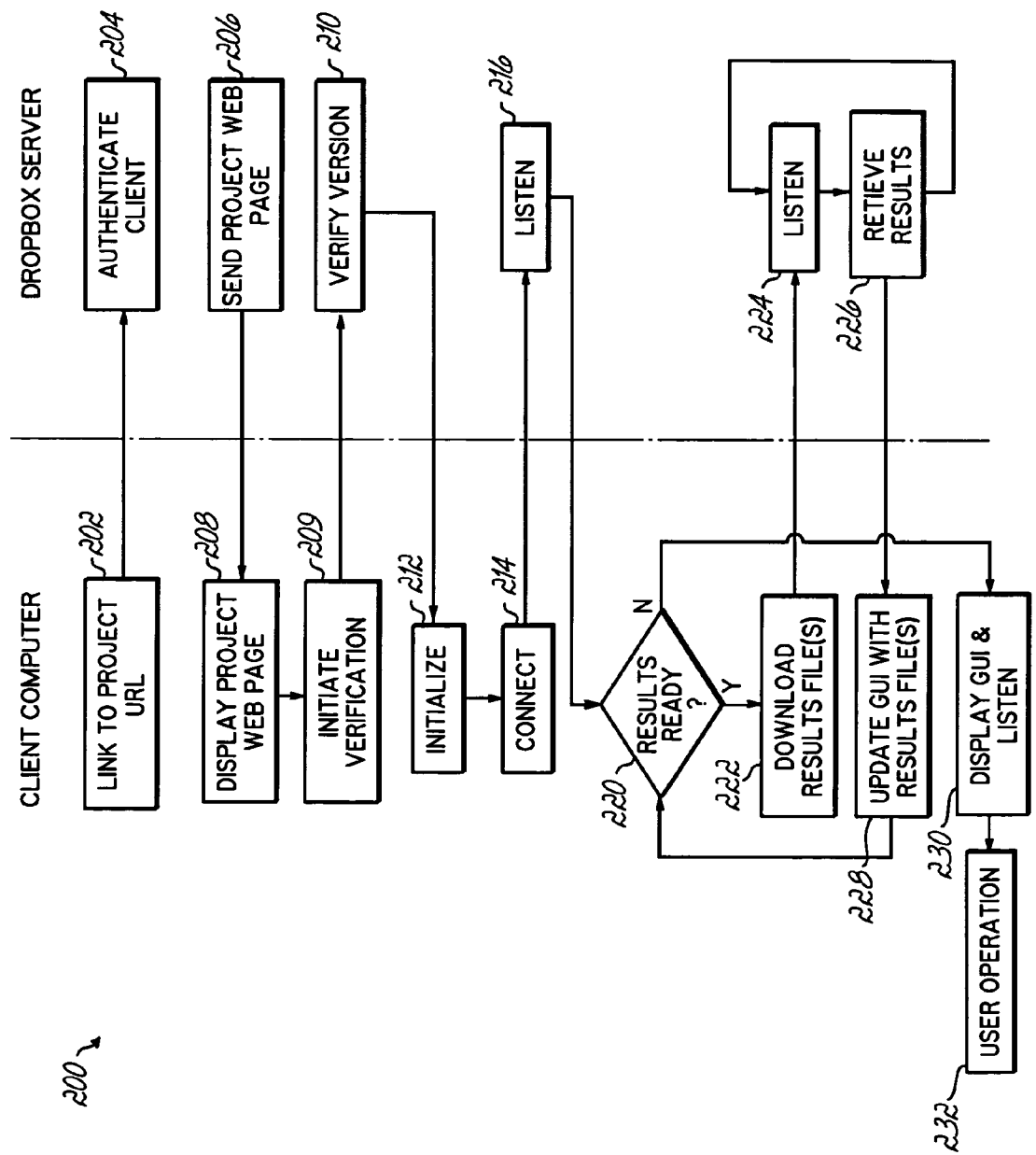
FIG. 2a is a flowchart having a sequence of steps respectively executable by the client and dropbox computers of FIG. 1 for establishing a connection.
Figure 2B:
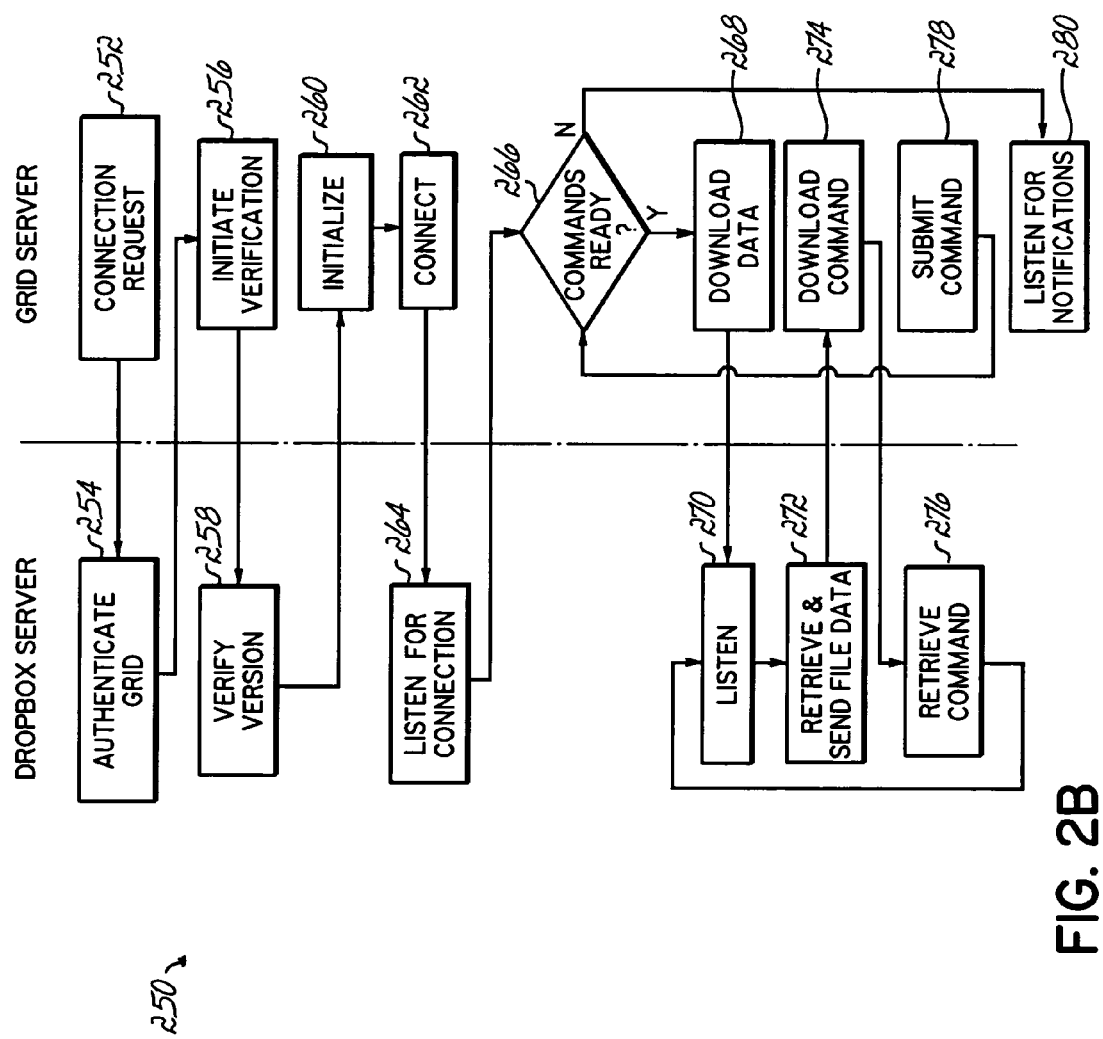
FIG. 2b is a flowchart having a sequence of steps respectively executable by the dropbox and grid computers of FIG. 1 for establishing a connection.

FIGS. 2a and 2b are flowcharts 200 and 250 having a sequence of steps configured for execution by the respective client, dropbox, and grid computers 12, 16, and 18 of FIG. 1. The illustrated steps of the flowcharts 200 and 250 are designed to establish connections between the respective computers 12, 16, and 18. The flowchart 200 of FIG. 2a more particularly shows steps for establishing a connection between the client computer 12 and dropbox server computer 16. In an embodiment consistent with the invention, the connection is accomplished through a firewall that otherwise separates the computers 16 and 12. To this end, the flowchart 200 of FIG. 2a includes processes at block 202 that initiate a connection to the dropbox server computer 16. Namely, the client computer 12 may link to a project Uniform Resource Location (URL) hosted by the dropbox server 16.

The hosted URL may require that the user be authenticated. For example, a graphic user interface (GUI) may be displayed on the monitor of the client computer 12. The GUI displayed by block 204 may prompt the user for authentication information. For instance, the GUI may ask the user to enter a password, biometric, or token at block 204. This security measure provides an additional data integrity feature by verifying the identity of a user, e.g., making sure that the connecting entity is on an approved list. If the authentication is successful, the dropbox server 16 will send the list of entitled applications at block 206. This information may be presented in the form of a web page and a collection of URL's on the client computer 12 at block 208.

The connection from the client computer 12 to the dropbox computer 16 continues at block 209. For example, a user at the client computer 12 may link to a URL that accesses program code configured to ensure at block 210 that the subsequent programs executed on the client computer 12 are the most recent versions available. This may be automatically accomplished by checking an application link or some checksum value on the client computer 12. If an application needs updating, the dropbox server computer 16 may automatically download a most current version for use by the client computer 12.

Where the link attempts of blocks 202 and 209 are successful, the application program will initialize at block 212 and attempt to open the connection at block 214. In doing so, the network interface 24 of the client computer 12 may establish a connection to the network interface 45 of the dropbox server 16. The dropbox server 16 may listen for the client computer 12 to initiate the connection at block 216. Once the connection is thus established at block 214, the connection may remain open such that a persistent connection to the dropbox computer 16 is maintained. Such a connection may pass through a provider firewall that otherwise protects the network as discussed herein. The persistent connection functions such that once a user is connected and initially authenticated, the user does not have to re-authenticate every time a new command is sent for execution.

With the connection established at 214, the client computer 12 will check the dropbox for computer 16 at block 220 for results that may have been generated while the connection was not established. If there are no results pending, the client computer 12 may display a GUI and listen for input from the user or notices from the dropbox 16 at block 230. If there are results pending at block 220, the client computer 12 will request to download the results at block 222. The dropbox server 16, which has been in a listening state at block 224, will retrieve and send the results to the client computer 12 at block 226. The client computer 12 will update information for the GUI at block 228. The process is repeated at block 220 until all the pending results have been downloaded and submitted.

The established connection to the dropbox computer 16 from the client computer 12 is typically asynchronous in nature, in addition to persistent. This asynchronous feature functions such that package submissions to the dropbox computer 16 from the client computer 12 do not need to be coordinated. This asynchronous feature is advantageous because a dropbox server computer 16 can still receive commands and store results where the grid server computer 18, for instance, becomes inoperable or inaccessible for a period.

FIG. 2B shows a sequence of steps for execution by the dropbox computer 16 and the grid server computer 18. Similar to FIG. 2A, the connection between the computers 16 and 18 may be established through a firewall that otherwise separates the computers 16 and 18. At block 252, the grid server computer 18 begins the connection sequence to the dropbox computer server 16 by issuing a connection request. As in the client/dropbox case, the dropbox computer 16 may require that the grid computer 18 be authenticated. The authentication manager 254 may initiate the use of an application program interface (API) in the connecting program of the grid server computer 18. The API utilized at block 254 may prompt the grid server computer 18 for authentication information. For instance, the API may ask the grid computer 18 to provide a password, biometric, token, or other identifier at block 254. This security measure provides an additional data integrity feature by verifying the identify of the grid computer 18, e.g., making sure that the connecting entity is on an approved list. If the authentication is successful, the dropbox server 16 will permit the grid computer 18 to continue the sequence at block 256, where the grid server computer 18 will request the most recent version of the subsequent program.

The dropbox server computer 16 may ensure at block 258 that the subsequent programs executed on the grid server computer 18 are the most recent versions available. This may be automatically accomplished by checking an application link or some checksum value on the grid server computer 18. If an application needs updating the dropbox server computer 16 may automatically download a most current version for the use by the grid computer 18.

Where the link attempts of blocks 252 and 256 are successful, the application program will initialize at block 260 and attempt to open the connection at block 262. In doing so, the network interface 34 of the grid server computer 18 may establish a connection to the network interface 45 of the dropbox server 16. The dropbox server 16 may thus listen for the connection to initiate at block 264. Once the connection is thus established at block 262, the connection may remain open such that a persistent connection to the dropbox computer 16 is maintained. Such a connection may pass through a provider firewall that otherwise protects the network as discussed herein. The persistent connection functions such that once a grid is connected and initially authenticated, the grid does not have to re-authenticate every time a new command is retrieved for execution.

With the connection established at block 262, the grid server computer 18 will check to see if there are pending commands at block 266. If there are no commands pending, the grid server computer 18 will proceed to listen for notifications from the dropbox server computer 16 at block 280. If commands are pending, the grid server computer 18 will request that the related data be downloaded at block 268. The dropbox server computer 16, which has been listening for requests at block 270, may retrieve and send the data at block 272 to the grid server computer 18. The grid server computer 18 may then proceed to request the download of a command at block 274 which is retrieved and sent by the dropbox server computer 16 at block 276. With the download of corresponding file data and the command completed, the grid server computer 18 may submit the command for execution at block 278. The process is repeated at block 266 until all the pending commands have been downloaded and submitted.

Figure 3:
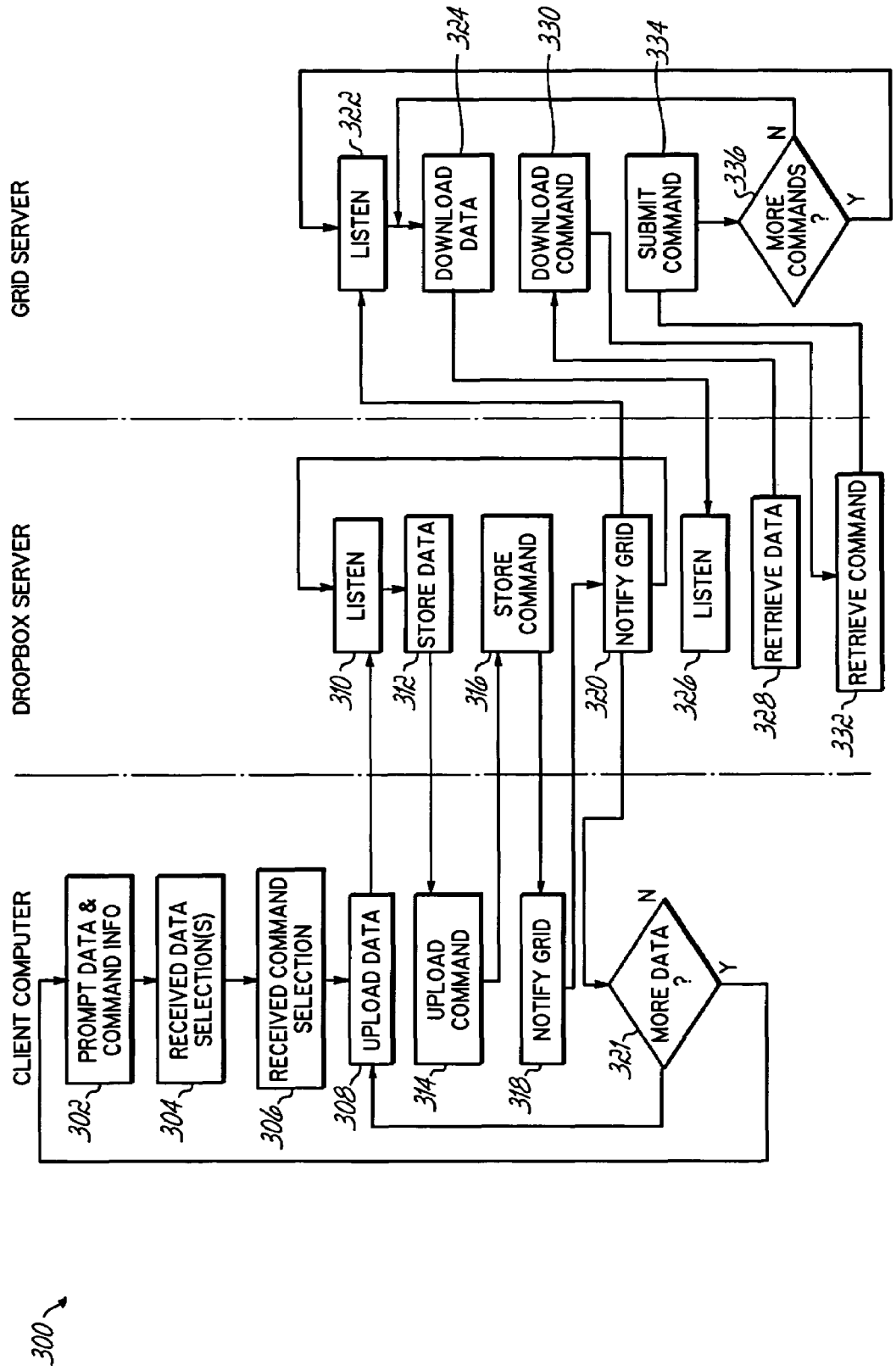
FIG. 3 is a flowchart having a sequence of steps respectively executable by the client, dropbox and grid computers of FIG. 1 for submitting file data and command instructions for execution.

FIG. 3 is a flowchart 300 having a sequence of respective steps executable by the client, dropbox and grid computers 12, 16 and 18 of FIG. 1 for communicating data file and command information for execution. The steps of the flowchart 300 presume that the respective connections of FIG. 2 have already been accomplished. As discussed herein, respective communications may be accomplished through respective firewalls that otherwise separate the computers 12, 16 and 18. Turning more particularly to block 302 of FIG. 3, the GUI displayed on the local client computer 12 may prompt the user for file data and command information. The command information typically comprises the name of a program that the user wants to execute inside of the grid server computer 18. To this end, the GUI may present the user with a list of different commands that they might want to use. For example, a client may wish to run a simulator program 47. Another customer may wish to execute a compiler or a design rules checking job. The client computer 12 may subsequently receive data and command input selections made using the GUI at blocks 304 and 306, respectively.

Applicable data file information is uploaded by the client computer 12 at block 308 of FIG. 3. The dropbox server computer 16, which has been listening for requests at block 310, may receive and store the data at block 312 behind the firewall of the provider. The client computer 12 may then proceed to upload a command at block 314 that is received and stored by the dropbox server computer 16 at block 316. With the upload of corresponding data and command completed, the client computer 12 may send a notification regarding the commands and data to the grid server computer 18 at blocks 318 via the dropbox server computer 16 at block 320 that is ultimately received by the grid server computer 18 at block 322. The grid server computer 18 may not be connected at this time. In such a case, the commands and data are stored and may be retrieved when the grid server computer 18 connects as shown in FIG. 2b. Having sent this notification to the dropbox computer 16, the client will proceed to repeat this process at block 321 as long as there is data to send.

The grid server computer 18 is thus notified that package data is present at the dropbox server computer 16. As will be described below in greater detail, the notification is addressed and automatically routed to the grid server computer 18. If the server computer 18 is unconnected, file data and the command are stored and picked up when the server finally connects. If the server computer 18 is running and listening when it receives this notification, the server computer 18 may begin downloading the data. The operating system 40 may automatically determine from the notification the contents of the package. This information may be used to determine what functions and addresses will be required for execution of the package in the context of the grid computing resources.

The operation system 40 of the grid server computer 18 listens at block 322 of FIG. 3 for the arrival of announced data and command information. The grid server computer 18 commences the download of the file data at block 324 and the command at block 330. In the meantime, the dropbox server computer operating system 36 has been listening at block 326 for requests from the grid server computer 18. Upon receipt of the download command, the dropbox server computer 16 retrieves the saved data at block 328 and a command at block 332. Downloading of the data and command may be accomplished in synchronized fashion to ensure proper sequential execution.

A downloaded command may be submitted at block 334 by the grid server computer 18. As discussed herein, a command is a function that may be selected using a button or field of the GUI presented on the client computer 12. The command information may be used by processes that cause the data selected to be moved over to the grid server computer 18, as well as the retrieval of the command, itself. The grid server computer 18 then executes the data using the command. That is, the command designated by the submitted command information may be executed on data already located at or downloaded by the grid server computer 18.

Back at the client computer 12, any additional data and/or commands desired at block 321 of FIG. 3 may be subsequently and/or concurrently uploaded at blocks 308 and 314, respectively. As discussed herein, the uploading of this additional data and commands may be accomplished asynchronously. This feature allows data to be submitted in real time as opposed to waiting to get all the data together for one single download. This feature thus allows the client computer 12 to send data more quickly and efficiently. If the server computer 18 cannot respond while additional data is incoming, then the server computer 18 is free to check the dropbox server computer 16 when the server computer 18 becomes available to take on the next task. The grid server computer 18 listens accordingly at block 322 for the arrival of such additional commands and/or data at block 336 of FIG. 3.

Figure 4:
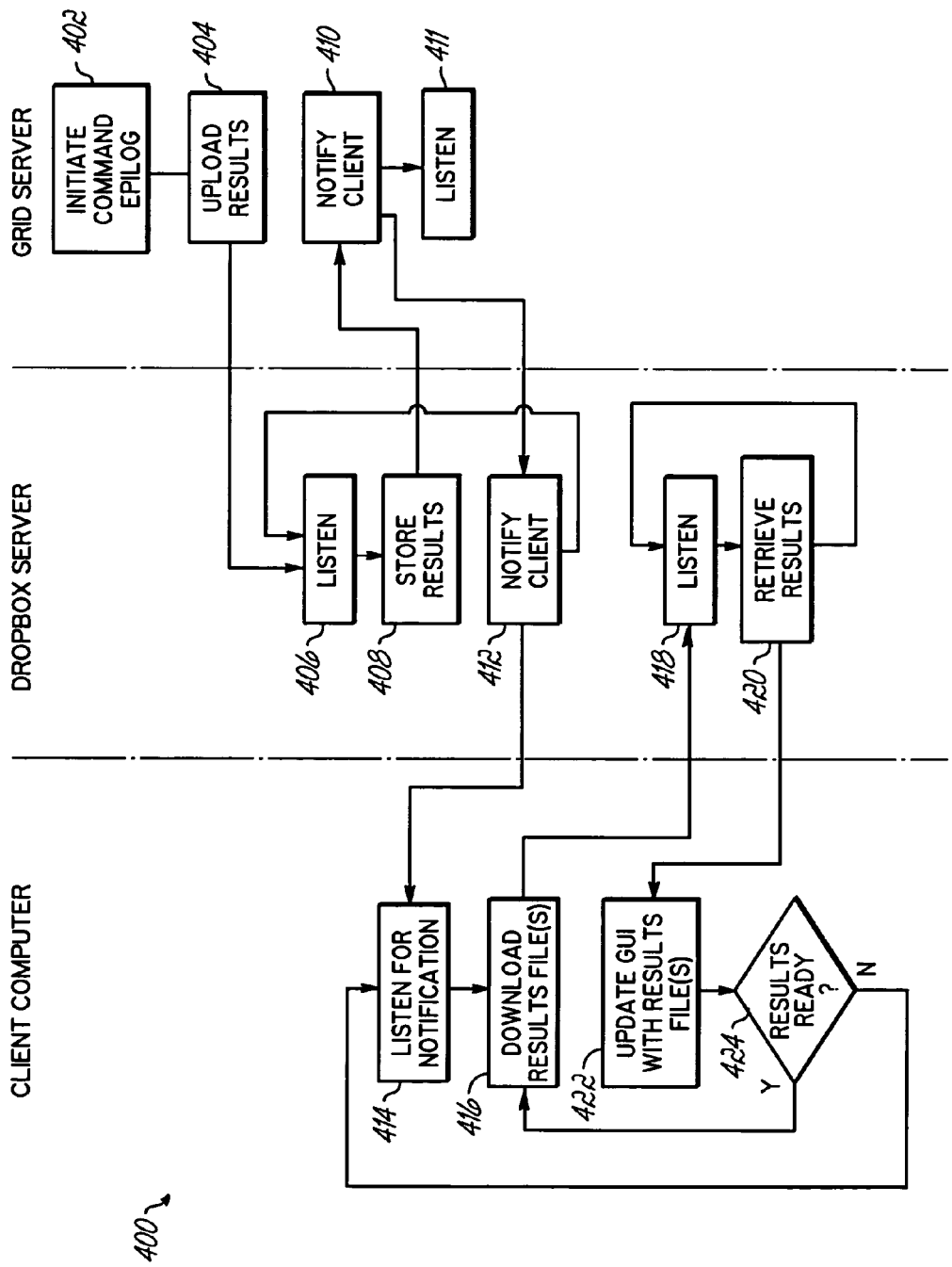
FIG. 4 is a flowchart having a sequence of steps respectively executable by the client, dropbox and grid computers of FIG. 1 for communicating the results of a simulation.

FIG. 4 is a flowchart 400 having a sequence of respective steps executable by the client, dropbox and grid computers 12, 16 and 18 of FIG. 1 for communicating the results of a simulation. As such, the steps of FIG. 4 presuppose that a command has been executed as discussed in the text describing FIG. 3. Following execution of the command, the grid server computer 18 initiates an epilog command at block 402 of FIG. 4. That is, once results have been obtained, an epilog associated with the executed command may indicate what results will be uploaded by the grid server computer 18 at block 404 of FIG. 4. The results designated by the epilog at block 402 are received by the dropbox server computer 16 at block 406. These results may be stored at block 408 of FIG. 4 at the dropbox server computer 16.

After uploading the results at block 404, the grid server computer 18 may send notification at block 410 back to the dropbox server computer 16. This notification may ultimately be passed on to the listening client computer 12 at block 414 of FIG. 4.

In response to the notification received at block 414, the client computer 12 requests a download of those results. As shown in FIG. 4, these results may be downloaded and received at block 416 by the client computer 12. The GUI displayed at the client computer 12 may be updated at block 422 to reflect the received results. The presentation of the results in the GUI may prompt user selection of the results. Such results may be stored and viewed on multiple, separate occasions by the user at the client computer 12. Should the client be unavailable, the results are held at the dropbox server computer 16 and downloaded upon a subsequent client connection as shown in FIG. 2A.

Figure 5:
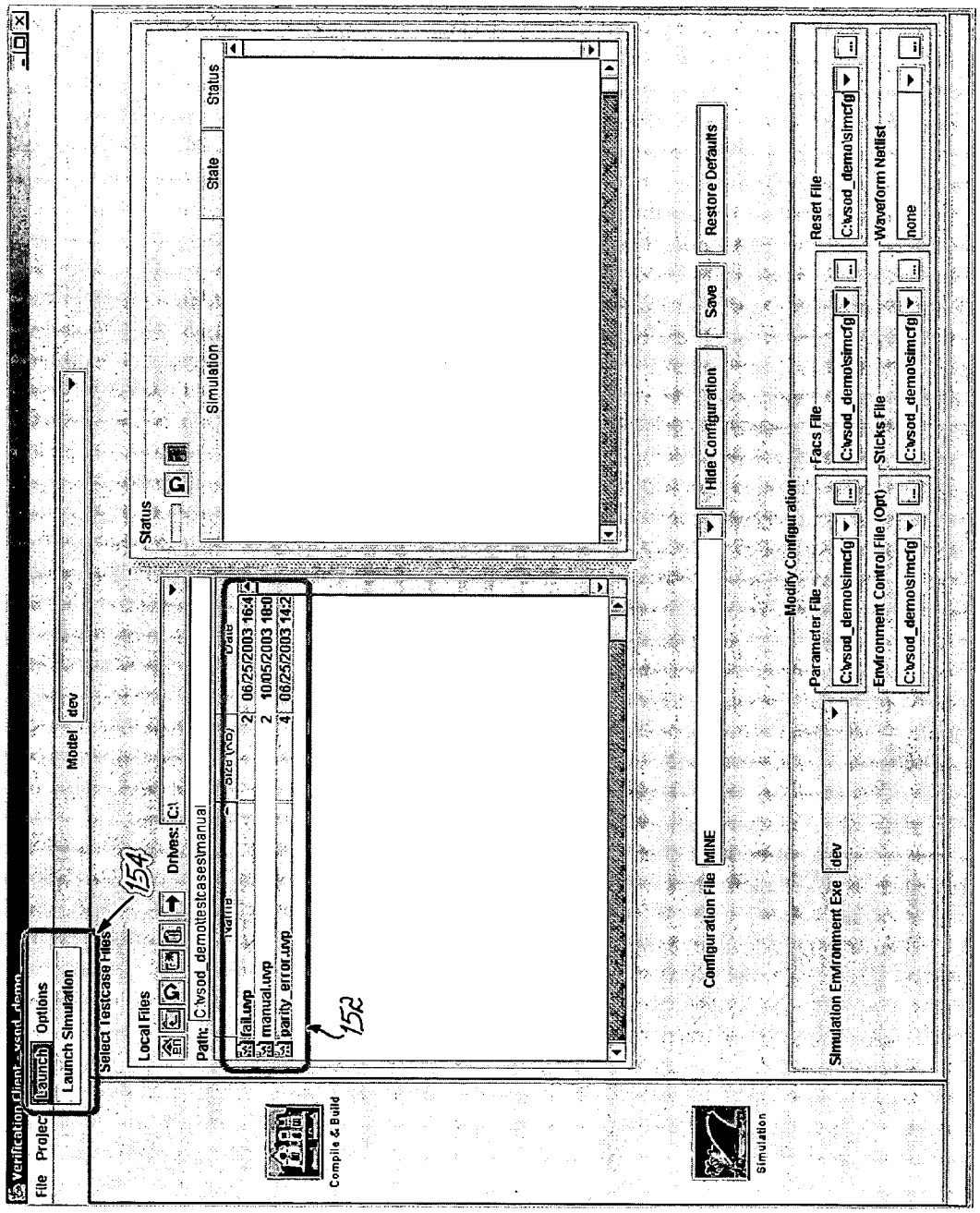
FIG. 5 shows an exemplary browser window screen for submitting data and commands as shown in FIG. 3.

FIG. 5 shows an exemplary browser window screen 150 for submitting data and commands as discussed in the text describing FIG. 3. The GUI screen 150 includes fields 152 displaying selectable data files. These fields 152 may link to data files stored on the client computer 12 and/or at the grid server computer 18. Applicable data fields may be selected for inclusion in a package by a user's double-clicking with a mouse on a field, for instance.

The user may similarly select command information from a pulldown menu 154 displayed on the screen 150. As discussed herein, a command is a program to be executed by the grid server computer 18. The command information selected by the user is typically a command name that is later associated with the program executed by the grid server computer 18. Similarly, the data selections made using fields 152 at the client computer 12 may include a designation useful in retrieving the actual data file executed by the grid computing resource.

Figure 6:
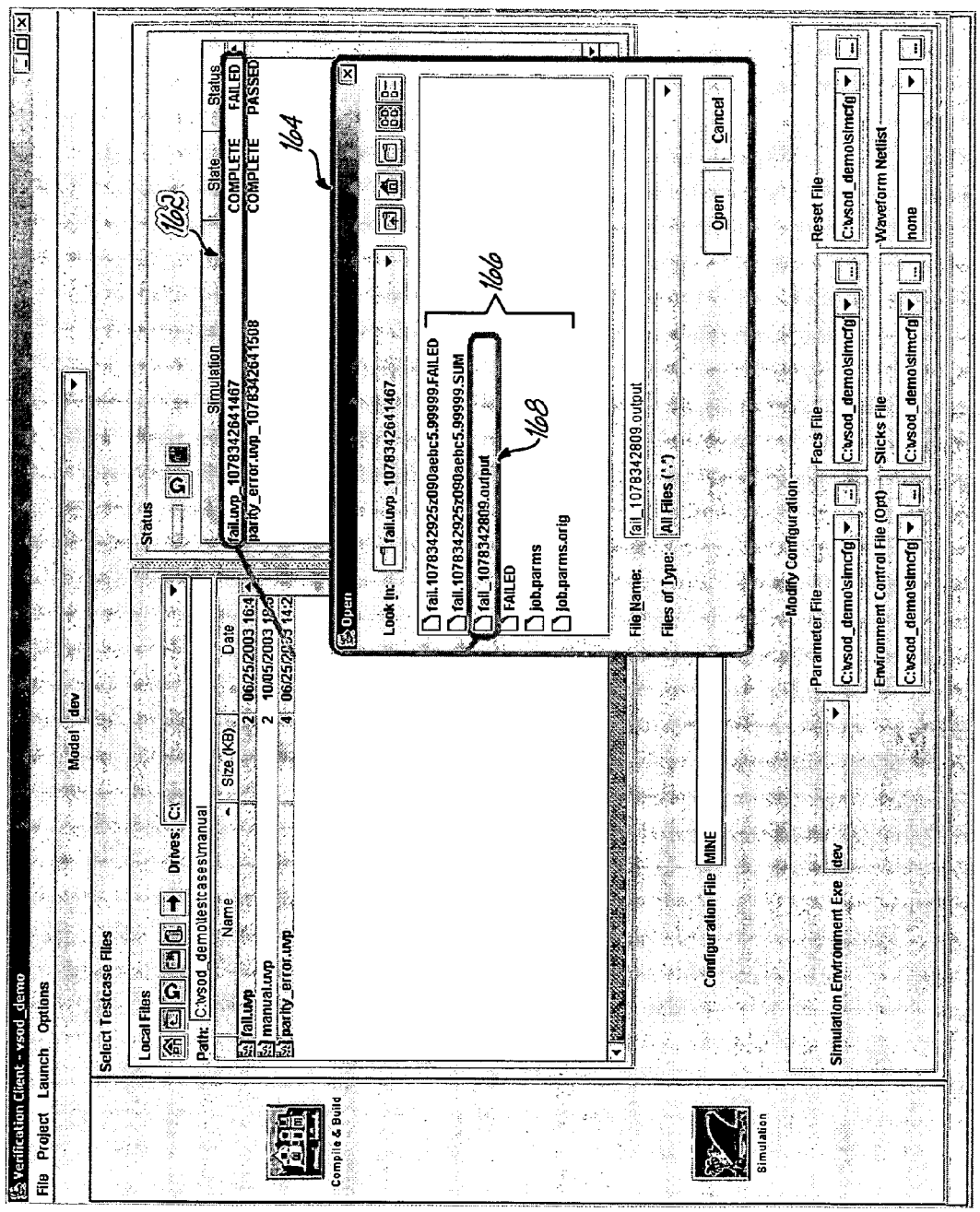
FIG. 6 shows an exemplary browser window screen for receiving and reviewing results as shown in FIG. 4.

FIG. 6 shows an updated, exemplary browser window screen 160 for receiving and reviewing results as described in the text associated with FIG. 4. The screen 160 includes fields displaying results produced by the grid server computer 18. As shown in FIG. 6, one such results field 162 includes results of a simulation command initiated using the GUI screen 150 of FIG. 5. The results field 162 includes status information, such as whether the simulation was completed and successful. Such status information may be constantly updated as discussed above. Where a user clicks on or otherwise selects the results field 162, a dialog box 164 may be presented to the user on the client computer 12 that displays different aspects, files or parts 166 of the selected results 162. The client may then select one or more of the displayed files 168 to have the file loaded into an application, for example. In this manner, the client may further evaluate or develop the selected file 168 in anticipation of another simulation.

In practice, a user may be prompted by a GUI at their local machine 12 to select command and file data comprising a microchip design package. The package may be submitted to a dropbox server 16, where the package is automatically communicated to a grid server computer 18. Where desired, the connection between the dropbox computer 16 and the user computer 12 may be accomplished using secure password and/or Internet protocol technologies. A simulation or other verification program executed by a grid resource of the grid server computer 18 will automatically process the package data to determine a verification result. This verification result may then be automatically communicated back to the user computer 12 via the dropbox computer 16 for evaluation by the user.

While the present invention has been illustrated by a description of various embodiments and while these embodiments have been described in considerable detail, it is not the intention of the applicants to restrict, or in any way limit, the scope of the appended claims to such detail. Additional advantages and modifications will readily appear to those skilled in the art. For example, program code of one embodiment may initiate storing at least one of the package data and the result according to secure transaction practices known in the art. That is, to ensure data is preserved in the event that a server or client computer crashes or becomes otherwise inaccessible. The invention in its broader aspects is therefore not limited to the specific details, representative apparatus and method, and illustrative example shown and described. For instance, while the specific example of a chip design simulation is discussed herein, one skilled in the art will appreciate that embodiments consistent with the present invention can accommodate virtually any application that requires remote access to a grid computing resource. Additionally, one skilled in the art will appreciate that commercially available program and hardware technologies capable of functioning in the role of dropbox server program code, for instance, may be used when appropriate and available. Accordingly, departures may be made from such details without departing from the spirit or scope of applicant's general inventive concept.

What is claimed is:

1. A method for managing access to a remote grid computing resource to which client access is restricted, the method comprising:

establishing a connection over a public telecommunications network between a client computer and a dropbox server computer having a dropbox memory;

receiving from the client computer package data for processing by the remote grid computing resource over the connection;

storing the package data received from the client computer in the dropbox memory of the dropbox server computer;

automatically communicating the package data for processing by the remote grid computing resource from the dropbox memory to the remote grid computing resource;

receiving from the remote grid computer resource a result generated automatically using the remote grid computer resource responsive to the communicated package data;

storing the result received from the remote grid computer resource in the dropbox memory of the dropbox server computer; and automatically communicating the result from the dropbox memory to the client computer via the connection, wherein establishing the connection, receiving the package data, storing the package data, automatically communicating the package data, receiving the result, storing the result and automatically communicating the result are performed without establishing any end-to-end connection between the client computer and the remote grid computing resource, and wherein the client computer and the remote grid computer resource communicate exclusively with one another by forwarding package data and results therebetween using the dropbox memory.

2. The method of claim 1, wherein establishing the connection over the public telecommunications network further includes authenticating an identity of the client attempting to establish the connection.

3. The method of claim 1, wherein establishing the connection over the public telecommunications network further includes establishing a persistent connection over the network, wherein the persistent connection remains open for a period long enough to communicate consecutive commands.

4. The method of claim 1, wherein establishing the connection over the public telecommunications network further includes verifying that an application used in generating the package data is current.

5. The method of claim 1, wherein receiving the package data further includes receiving information relating to at least one of file data and a command.

6. The method of claim 1, wherein receiving the package data further includes receiving the package data as previously received package data is concurrently executed by the remote grid computing resource.

7. The method of claim 1, wherein receiving the package data further includes prompting user input using a graphic user interface configured to allow user selection of the package data comprising at least one of file data and a command.

8. The method of claim 1, wherein communicating the result to the client computer further includes communicating to the client a status relating to at least one of the package data and the result using a graphic user interface.

9. The method of claim 1, wherein establishing the connection over the public telecommunications network further includes establishing an Internet connection.

10. The method of claim 1, wherein establishing the connection over the public telecommunications network further includes establishing a secure connection using encryption technology.

11. The method of claim 1, wherein establishing the connection over the public telecommunications network further includes establishing the connection through a firewall.

12. The method of claim 1, wherein receiving the result and storing the result in the dropbox memory are performed while no connection is established between the client computer and the dropbox server computer, the method further comprising:

reestablishing the connection between the client computer and the dropbox server computer; and in response to reestablishing the connection, automatically checking the dropbox memory to determine that the result is stored in the dropbox memory, wherein automatically communicating the result from the dropbox memory to the client computer via the connection is performed in response to determining that the result is stored in the dropbox memory.

13. The method of claim 1, wherein receiving the package data and storing the package data in the dropbox memory are performed while no connection is established between the dropbox server computer and the remote grid computing resource, the method further comprising:

establishing a connection between the remote grid computing resource and the dropbox server computer; and in response to establishing the connection, automatically checking the dropbox memory to determine that the package data is stored in the dropbox memory, wherein automatically communicating the package data from the dropbox memory to the remote grid computing resource is performed in response to determining that the package data is stored in the dropbox memory.

14. A method for managing access to a remote grid computing resource to which client access is restricted, the method comprising:

establishing a connection over a public telecommunications network between a client computer and a dropbox server computer including access to the remote grid computing resource, the dropbox server computer having a dropbox memory;

sending package data for processing by the remote grid computing resource to the dropbox server computer over the connection;

storing the package data sent to the dropbox server computer in the dropbox memory of the dropbox server computer;

communicating the package data to the remote grid computing resource from the dropbox memory of the dropbox server computer;

automatically generating a result by using the remote grid computer resource to process the package data;

sending the result from the remote grid computer resource to the dropbox server computer;

storing the result sent by the remote grid computer resource in the dropbox memory of the dropbox server computer; and communicating the result from the dropbox memory to the client computer using the connection, wherein establishing the connection, sending the package data, storing the package data, communicating the package data, automatically generating the result, sending the result, storing the result, and communicating the result are performed without establishing any end-to-end connection between the client computer and the remote grid computing resource, and wherein the client computer and the remote grid computer resource communicate exclusively with one another by forwarding package data and results therebetween using the dropbox memory.

15. The method of claim 14, wherein sending the result and storing the result in the dropbox memory are performed while no connection is established between the client computer and the dropbox server computer, the method further comprising:

reestablishing the connection between the client computer and the dropbox server computer; and in response to reestablishing the connection, automatically checking the dropbox memory to determine that the result is stored in the dropbox memory, wherein communicating the result from the dropbox memory to the client computer via the connection is performed in response to determining that the result is stored in the dropbox memory.

16. The method of claim 14, wherein sending the package data and storing the package data in the dropbox memory are performed while no connection is established between the dropbox server computer and the remote grid computing resource, the method further comprising:

establishing a connection between the remote grid computing resource and the dropbox server computer; and in response to establishing the connection, automatically checking the dropbox memory to determine that the package data is stored in the dropbox memory, wherein communicating the package data from the dropbox memory to the remote grid computing resource is performed in response to determining that the package data is stored in the dropbox memory.

17. A method for managing access to a remote grid computing resource to which client access is restricted, the method comprising:

establishing a connection over a public telecommunications network between a client computer and a dropbox server computer having a dropbox memory and including access to the remote grid computing resource;

determining package data for processing by the remote grid computing resource;

sending the package data to the dropbox server computer over the connection such that the package data is stored in the dropbox memory of the dropbox server computer for subsequent communication from the dropbox memory to the remote grid computing resource; and receiving a result generated automatically using the remote grid computer resource to process the package data, wherein the result is communicated from the remote grid computer resource to the dropbox server computer, stored in the dropbox memory, and subsequently communicated from the dropbox memory to the client computer, wherein establishing the connection, determining the package data, sending the package data and receiving the result are performed without establishing any end-to-end connection between the client computer and the grid computing resource, and wherein the client computer and the remote grid computer resource communicate exclusively with one another by forwarding package data and results therebetween using the dropbox memory.

18. The method of claim 17, wherein the result is communicated from the remote grid computer resource to the dropbox computer and stored in the dropbox memory while no connection is established between the client computer and the dropbox server computer, the method further comprising:

reestablishing the connection between the client computer and the dropbox server computer; and in response to reestablishing the connection, automatically checking the dropbox memory to determine that the result is stored in the dropbox memory, wherein receiving the result is performed in response to determining that the result is stored in the dropbox memory.

19. The method of claim 17, wherein sending the package data is performed while no connection is established between the dropbox server computer and the remote grid computing resource, the method further comprising:

establishing a connection between the remote grid computing resource and the dropbox server computer; and in response to establishing the connection, automatically checking the dropbox memory to determine that the package data is stored in the dropbox memory, wherein the package data is automatically communicated from the dropbox memory to the remote grid computing resource in response to determining that the package data is stored in the dropbox memory.

* * * * *